(12) United States Patent
Zhang et al.

(10) Patent No.: US 9,172,509 B2
(45) Date of Patent: Oct. 27, 2015

(54) METHOD FOR TRANSMISSION TIME INTERVAL BUNDLING IN THE UPLINK

(75) Inventors: Guodong Zhang, Syosset, NY (US); Jin Wang, Central Islip, NY (US); Kyle Jung-Lin Pan, Smithtown, NY (US); Jean-Louis Garvreau, La Prairie (CA); Stephen E. Terry, Northport, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 713 days.

(21) Appl. No.: 12/421,838

(22) Filed: Apr. 10, 2009

(65) Prior Publication Data

US 2009/0257408 A1    Oct. 15, 2009

Related U.S. Application Data

(60) Provisional application No. 61/044,111, filed on Apr. 11, 2008, provisional application No. 61/052,725, filed on May 13, 2008, provisional application No. 61/083,789, filed on Jul. 25, 2008, provisional application No. 61/081,444, filed on Jul. 17, 2008.

(51) Int. Cl.
*H04J 3/00* (2006.01)
*H04L 1/16* (2006.01)
*H04L 1/18* (2006.01)

(52) U.S. Cl.
CPC ............ *H04L 1/1621* (2013.01); *H04L 1/1635* (2013.01); *H04L 1/189* (2013.01)

(58) Field of Classification Search
USPC ......... 370/203, 204–215, 229–240, 241–253, 370/310–337, 395.3, 395.4, 395.41, 395.42, 370/395.5, 395.52, 431–457, 458–463, 370/464–497, 498–522, 523–520, 521–529
See application file for complete search history.

(56) References Cited

U.S. PATENT DOCUMENTS

| | | | |
|---|---|---|---|
| 7,996,029 B2 * | 8/2011 | Chun et al. | 455/509 |
| 2007/0275086 A1 * | 11/2007 | Nowak et al. | 424/537 |
| 2008/0186892 A1 * | 8/2008 | Damnjanovic | 370/311 |
| 2008/0232284 A1 * | 9/2008 | Dalsgaard et al. | 370/310 |
| 2009/0086657 A1 * | 4/2009 | Alpert et al. | 370/310 |
| 2009/0129317 A1 * | 5/2009 | Che et al. | 370/328 |
| 2009/0196366 A1 * | 8/2009 | Shen et al. | 375/260 |
| 2009/0197630 A1 * | 8/2009 | Ahn et al. | 455/522 |
| 2009/0204862 A1 * | 8/2009 | Chun et al. | 714/748 |
| 2009/0238091 A1 * | 9/2009 | Kim et al. | 370/252 |
| 2009/0238121 A1 * | 9/2009 | Kotecha | 370/329 |
| 2009/0238128 A1 * | 9/2009 | Park et al. | 370/329 |
| 2009/0245225 A1 * | 10/2009 | Tseng | 370/345 |
| 2010/0192035 A1 * | 7/2010 | Sagfors et al. | 714/748 |
| 2010/0202382 A1 * | 8/2010 | Park et al. | 370/329 |

(Continued)

OTHER PUBLICATIONS

Alcatel-Lucent, "RAN2 Aspects of the Solutions for Subframe Bundling", 3GPP TSG-RAN WG2#61, R2-081446, (Shenzhen, China, Mar. 31-Apr. 4, 2008).

(Continued)

*Primary Examiner* — Jung-Jen Liu
(74) *Attorney, Agent, or Firm* — Condo Roccia Koptiw LLP

(57) ABSTRACT

A method and apparatus for supporting uplink Transmission Time Interval (TTI) bundling in Long Term Evolution (LTE) is provided. Described are related method and apparatus for signaling, activation/deactivation and wireless transmit/receive unit (WTRU) behavior.

23 Claims, 7 Drawing Sheets

(56) References Cited

U.S. PATENT DOCUMENTS

| | | | | |
|---|---|---|---|---|
| 2010/0275086 | A1* | 10/2010 | Bergquist et al. | 714/748 |
| 2010/0279634 | A1* | 11/2010 | Sagfors et al. | 455/127.1 |
| 2010/0290509 | A1* | 11/2010 | Dalsgaard et al. | 375/220 |
| 2010/0322122 | A1* | 12/2010 | Synnergren et al. | 370/310 |
| 2010/0325508 | A1* | 12/2010 | Hu et al. | 714/749 |
| 2011/0002293 | A1* | 1/2011 | Yuk et al. | 370/329 |
| 2011/0021228 | A1* | 1/2011 | Kim et al. | 455/507 |
| 2011/0083066 | A1* | 4/2011 | Chung et al. | 714/807 |
| 2011/0124360 | A1* | 5/2011 | Sagfors et al. | 455/509 |
| 2011/0141878 | A1* | 6/2011 | Che et al. | 370/216 |
| 2011/0173519 | A1* | 7/2011 | Kuri et al. | 714/799 |
| 2011/0182245 | A1* | 7/2011 | Malkamaki et al. | 370/329 |

OTHER PUBLICATIONS

Catt, "TTI bundling Configuration," 3GPP TSG RAN WG2 #62, R2-082317 (May 5-9, 2008).
Ericsson, "EUL Coverage Enhancements", 3GPP TSG-RAN WG2#61, R2-081779, (Shenzhen, China, Mar. 31-Apr. 4, 2008).
Ericsson, "Evaluation of TTI-Bundling Alternatives", 3GPP TSG-RAN WG2#61bis, R2-081465, (Shenzhen, China Mar. 31-Apr. 4, 2008).
Ericsson, "Outcome of Offline Discussions on PDCCH Contents", 3GPP TSG-RAN, R1-081102.
Ericsson, "Text Proposal for TTI bundling," 3GPP TSG-RAN WG2 #62, R2-082149 (May 5-9, 2008).
Ericsson, "Text Proposal for TTI Bundling", 3GPP TSG-RAN WG2#61bis, R2-081466, (Shenzhen, China, Mar. 31-Apr. 4, 2008).
Ericsson, "TTI-Bundling Considerations for TDD," 3GPP TSG-RAN WG2 #62, R2-082148 (May 5-9, 2008).
Interdigital, "Reply LS on Uplink Coverage for LTE", 3GPP TSG-RAN WG2#61, R2-081326, (Sorrento, Italy, Feb. 11-15, 2008).
Interdigital, "Report of MAC Activities", 3GPP TSG-RAN WG2#61bis, R2-081799, (Shenzhen, China, Mar. 31-Apr. 4, 2008).
ZTE, "TTI bundling impact on DRX Inactivity Timer," 3GPP TSG-RAN WG2#62, R2-082253 (May 5-9, 2008).
Ericsson, "Evaluation of TTI-Bundling Alternatives", 3GPP TSG-RAN WG2#61bis, R2-081465, (Shenzhen, China, Mar. 31-Apr. 4, 2008).
3rd Generation Partnership Project; Technical Specification Group Radio Access Network; Evolved Universal Terrestrial Radio Access (E-UTRA); Physical layer procedures (Release 8); 3GPP TS 36.213 V8.2.0; Mar. 2008; 30 pages.
3rd Generation Partnership Project; Technical Specification Group Radio Access Network; Evolved Universal Terrestrial Radio Access (E-UTRA); Medium Access Control (MAC) protocol specification (Release 8); 3GPP TS 36.2321 V8.0.0; Dec. 2007; 23 pages.
$3^{rd}$ Generation Partnership Project (3GPP), R1-080339, "On VoIP Uplink Coverage for LTE", Ericsson, 3GPP TSG-RAN WG1, Meeting # 51 bis, Sevilla, Spain, Jan. 14-18, 2008, 3 pages.
$3^{rd}$ Generation Partnership Project (3GPP), R1-080444, "On the Need for VoIP Coverage Enhancement for the E-UTRA UL", Alcatel-Lucent, 3GPP TSG-RAN WG1, Meeting # 51 bis, Sevilla, Spain, Jan. 14-18, 2008, 10 pages.
$3^{rd}$ Generation Partnership Project (3GPP), R1-081103, "Reply LS on Uplink Coverage for LTE", RAN1, 3GPP TSG-RAN WG1, Meeting # 52, Sorrento, Italy, Feb. 11-15, 2008, 3 pages.
$3^{rd}$ Generation Partnership Project (3GPP), R2-081185, "UL Coverage Enhancement for VoIP Transmission", 3GPP TSG RAN WG2, Meeting # 61, Sorrento, Italy, Feb. 11-15, 2008, 3 pages.

* cited by examiner

| F L A G | RB Allocation 0101...001 | MCS | DMRS | TPC, RSN etc | |

FIG. 5(a)

| F L A G | RB Allocation | MCS | DMRS | TPC, RSN etc | |
|---|---|---|---|---|---|
| | 0000...000 | # of bundled TTIs, Restricted MCS, RB Allocation | | | |

FIG. 5(b)

| TTI Bundling 0 = Off | F L A G | RB Allocation | MCS | DMRS | TPC, RSN etc | |

FIG. 6(a)

| TTI Bundling 1 - On | F L A G | RB Allocation | MCS | DMRS | TPC, RSN etc | |
|---|---|---|---|---|---|---|
| | | # of bundled TTIs, Restricted MCS, RB Allocation | | | | |

FIG. 6(b)

```
-- ASN1START

MAC-Configuration ::=              SEQUENCE {
    maxNumberOfUL-Transm           INTEGER (0)      OPTIONAL,       -- Cond ConnSU, range
FFS
    semiPersistSchedIntervalDL     INTEGER (0)      OPTIONAL,       -- type, range
FFS
    semiPersistSchedIntervalUL     INTEGER (0)      OPTIONAL,       -- type, range
FFS
    RV_Values                      ENUMERATED {RVs_for_tti2, RVs_for_tti4, RVs_for_tti8}
    OPTIONAL,
range FFS
    periodicBSR-Timer              INTEGER (0),                     -- need, type,
    range FFS
    drx-Configuration              SEQUENCE {
        onDurationTimer            INTEGER (0)      DEFAULT 0,      -- type, range, default
FFS
        drx-InactivityTimer        INTEGER (0)      DEFAULT 0,      -- type, range, default
FFS
        drx-RetransmissionTimer    INTEGER (0)      DEFAULT 0,      -- type, range, default
FFS
        longDRX-Cycle              INTEGER (0)      DEFAULT 0,      -- type, range, default
FFS
        shortDRX                   SEQUENCE {
            shortDRX-Cycle             INTEGER (0) DEFAULT 0,  -- type, range, default
FFS
            drxShortCycleTimer         INTEGER (0) DEFAULT 0   -- type, range, default
FFS
        }       OPTIONAL
    }           OPTIONAL
}

-- ASN1STOP
```

FIG. 7

```
MAC-Configuration ::=                         SEQUENCE {
    maxNumberOfUL-Transm                      INTEGER (0)         OPTIONAL,       -- Cond ConnSU, range
FFS
    semiPersistSchedIntervalDL                INTEGER (0)         OPTIONAL,              -- type, range
FFS
    semiPersistSchedIntervalUL                INTEGER (0)         OPTIONAL,              -- type, range
FFS
    TTIBundleForSemiPersistSched              INTEGER (0)         OPTIONAL,           -- type, range FFS
    reconfigforTTIbundlingofSemiPersistSched  INTEGER (0)         OPTIONAL,              -- type, range
FFS
    periodicBSR-Timer                         INTEGER (0),                               -- need, type,
    range FFS
    drx-Configuration                         SEQUENCE {
        onDurationTimer                       INTEGER (0)         DEFAULT 0,   -- type, range, default
FFS
        drx-InactivityTimer                   INTEGER (0)         DEFAULT 0,   -- type, range, default
FFS
        drx-RetransmissionTimer               INTEGER (0)         DEFAULT 0,   -- type, range, default
FFS
        longDRX-Cycle                         INTEGER (0)         DEFAULT 0,   -- type, range, default
FFS
        shortDRX                              SEQUENCE {
            shortDRX-Cycle                    INTEGER (0) DEFAULT 0,   -- type, range, default
FFS
            drxShortCycleTimer                INTEGER (0) DEFAULT 0    -- type, range, default
FFS
        }       OPTIONAL
    }       OPTIONAL
}
```

METHOD FOR TRANSMISSION TIME INTERVAL BUNDLING IN THE UPLINK

CROSS REFERENCE TO RELATED APPLICATIONS

This application claims the benefit of U.S. Provisional Application Nos. 61/044,111, filed Apr. 11,2008; 61/052, 725, filed May 13,2008; 61/083,789, filed Jul. 25, 2008 and 61/081,444, filed Jul. 17, 2008, which are incorporated by reference as if fully set forth.

FIELD OF INVENTION

This application is related to wireless communications.

BACKGROUND

Third generation partnership project (3GPP) and 3GPP2 are considering long term evolution (LTE) for radio interface and network architecture. There is an ever-increasing demand on wireless operators to provide better quality voice and high-speed data services. As a result, wireless communication systems that enable higher data rates and higher capacities are a pressing need.

In evolved Universal Mobile Telecommunication System (UMTS) Terrestrial Radio Access (evolved UTRA), the network architecture includes a radio access network that provides wireless transmit/receive units (WTRUs) access to a core network of a cellular communication system. Within the radio access network, radio resources are divided into blocks of time (sub-frames) and frequency (frequency blocks).

Transmission Time Interval (TTI) bundling in the uplink has been proposed to improve coverage for WTRUs near the cell edge. The solution is characterized by a single transport block that is coded and transmitted in a set of consecutive subframes. A bundle is treated as a single resource, i.e., a single grant, and a single hybrid-Automatic Repeat Request (HARQ) acknowledgement is used for each bundle. The same HARQ process number is used in each of the bundled subframes. The HARQ Round Trip Time (RTT) is different than for the non-bundling case to reduce delays. The relation between subframe number and HARQ process number is unaffected for non-bundled subframes. Bundling can be applied to Frequency Division Duplex (FDD) as well as Time Division Duplex (TDD). For TDD, the bundling size needs to take the allocations of subframes to Uplink (UL) and Downlink (DL) into account.

For an example in a LTE FDD system, a HARQ process and its different redundancy versions (RV) are bundled and transmitted in a fixed number of subframes, timeslots or applicable blocks of time or frequency and may be designated as $N_{bundle}$ and may also referred to as the TTI bundling value. For example, $N_{bundle}=4$, is the current working assumption in 3GPP standards. A single transport block may be coded and transmitted in a set of consecutive subframes.

Three alternatives for TTI bundles are shown in FIG. 1, FIG. 2 and FIG. 3, respectively. In Alternative 1, the timing relation between the last subframe in the TTI bundle and the transmission instant of the HARQ acknowledgement is identical to the case of no bundling. For the case of FDD, if the last subframe in a TTI bundle is subframe n, then the acknowledgement is transmitted in subframe n+4 and if the first subframe in a TTI bundle is subframe k, then any HARQ retransmissions begins in subframe k+2*HARQ_RTT. In Alternative 2, the timing relation between the first subframe in the TTI bundle and the transmission instant of the HARQ acknowledgement is identical to the case of no bundling. For the case of FDD, the HARQ acknowledgement is obtained from decoding the first subframe only. In Alternative 3, the timing relation between the last subframe in the TTI bundle and the transmission instant of the HARQ acknowledgement is identical to the case of no bundling. For the case of FDD, if the last subframe in a TTI bundle is subframe n then the acknowledgement is transmitted in subframe n+4

Uplink TTI bundling may be activated and deactivated by radio resource controller (RRC) signaling. When switched on, TTI bundling applies to all uplink transmissions using PUSCH. To reduce the number of options and the associated testing, the number of configurations of the bundle size is minimized. Preferably only a single fixed value of the number of subframes in a bundle is specified. But there are several deficiencies with respect to this method such as but not limited to not providing criteria for triggering TTI bundling, no defined WRTU behaviors, no HARQ process related behaviors and no details related to Semi-Persistent Scheduling (SPS).

SUMMARY

The present application discloses methods and apparatus for supporting TTI bundling in the uplink in evolved Universal Mobile Telecommunication System (UMTS) Terrestrial Radio Access (evolved UTRA) that includes for example new signaling mechanisms including the use of Physical Downlink Control Channel (PDCCH) and Medium Access Control (MAC) Control Element (CE) signaling, triggering criteria, activation and de-activation methods, wireless transmit/receive units (WTRU) behavior definitions, and TTI bundling with Semi-Persistent Scheduling.

BRIEF DESCRIPTION OF THE DRAWINGS

A more detailed understanding may be had from the following description, given by way of example in conjunction with the accompanying drawings wherein:

FIG. 5(a) shows a standard Physical Downlink Control Channel (PDCCH) Downlink Control Information (DCI) format 0;

FIG. 5(b) shows a PDCCH DCI format 0 in accordance with an example embodiment;

FIG. 6(a) shows a PDCCH DCI format 0 in accordance with another example embodiment;

FIG. 6(b) shows a PDCCH DCI format 0 in accordance with yet another example embodiment;

FIG. 7 shows an example Information Element Medium Access Control (MAC) Configuration table in accordance with an example embodiment;

FIG. 12 shows an example Information Element MAC Configuration table for Semi-Persistent Scheduling in accordance with an example embodiment.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
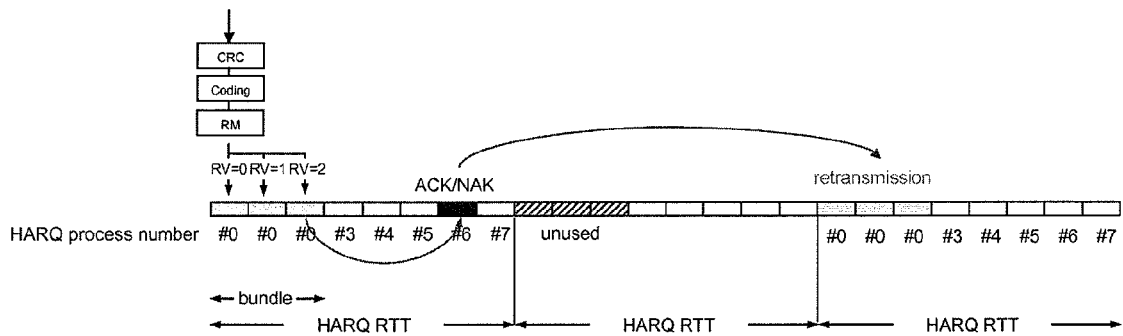
FIG. 1 shows a Transmission Time Interval (TTI) bundling sequence.
Figure 2:
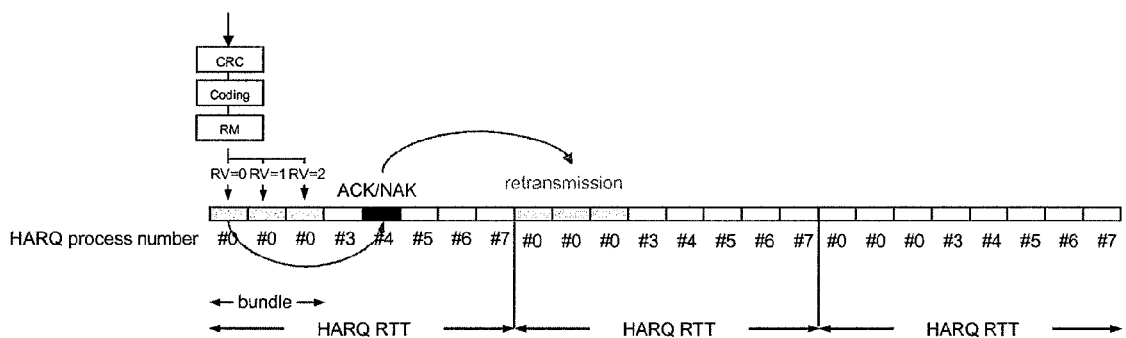
FIG. 2 shows an alternate TTI bundling sequence.
Figure 3:
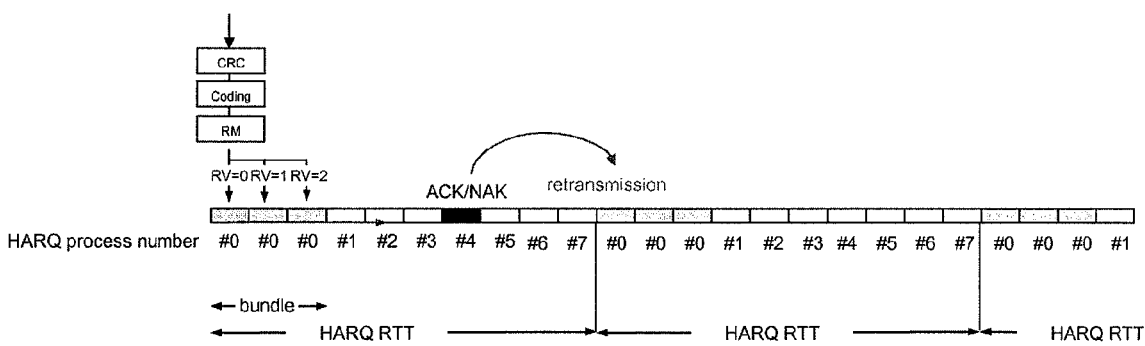
FIG. 3 shows another alternate TTI bundling sequence.
Figure 4:
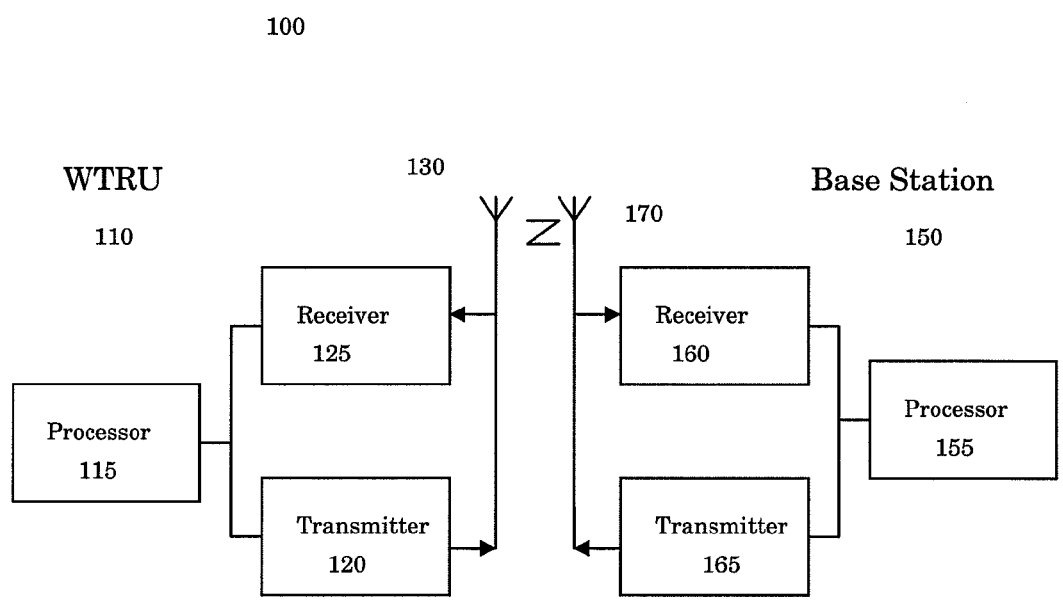
FIG. 4 shows an example functional block diagram of a wireless transmit/receive unit (WRTU) and a base station.

Referring now to FIG. 4, there is shown an example functional block diagram 100 of a WTRU 110 and a base station 150 in communication with one another and may be configured to activate, deactivate, process and/or otherwise support Transmission Time Interval (TTI) bundling.

In addition to the components that may be found in a typical WTRU, the WTRU 110 includes a processor 115, a transmitter 120, a receiver 125, and at least one antenna 130 to facilitate wireless communication. The processor 115 is configured to perform a method for activating, deactivating, processing and/or otherwise supporting TTI bundling in a wireless communication system in accordance with the present application. The receiver 125 and the transmitter 120 are in communication with the processor 115. The antenna 130 is in communication with both the receiver 125 and the transmitter 120 to facilitate the transmission and reception of wireless data.

In addition to the components that may be found in a typical base station, the base station 150 includes a processor 155, a receiver 160, a transmitter 165, and at least one antenna 170. The processor 155 is configured to perform a method for activating, deactivating, processing and/or otherwise supporting TTI bundling in a wireless communication system in accordance with the present application. The receiver 160 and the transmitter 165 are in communication with the processor 155. The antenna 170 is in communication with both the receiver 160 and the transmitter 165 to facilitate the transmission and reception of wireless data.

The following discussion presents signaling methods for TTI bundling, triggering criteria to activate/deactivate TTI bundling, activation and deactivation details, WRTU behavior upon activation and deactivation, processing issues, partial services with respect to TTI bundling and the use of Semi-Persistent Scheduling (SPS) with TTI bundling.

Signaling Methods And Information Provided

In addition to signaling using Radio Resource Control (RRC), exemplary methods for signaling and/or supporting TTI bundling include using the Physical Downlink Control Channel (PDCCH) and the Medium Access Control (MAC) Control Element (CE).

In an exemplary embodiment, PDCCH signaling is used as a method of signaling that supports TTI bundling. The PDCCH is used to carry downlink control information (DCI) such as scheduling grants, assignments, power-control commands, uplink scheduling grants, resource block allocations/assignments, and HARQ related information. The PDCCH carries multiple DCI formats depending on the type of required control information.

FIG. 5(a) and FIG. 5(b), show a DCI format 0 for a standard uplink grant and a DCI format 0 for an uplink grant that supports TTI bundling. The DCI format 0 includes multiple fields but for the purposes of the present description the relevant fields are Resource Block (RB) Allocation/Assignment; Modulation and Coding Scheme (MCS); and Demodulation Reference Symbol (DMRS).

Referring specifically to FIG. 5(b), the PDCCH can use one reserved or spare bit-field in either the RB allocation field, the MCS field or the DMRS field of the existing PDCCH DCI format 0 to indicate activation/de-activation of TTI bundling for the WRTU. In an illustrative embodiment, in PDCCH DCI format 0, a RB allocation field with "0000000000000" can be used to activate TTI bundling. The remaining fields of the disclosed PDCCH DCI format 0 can be used to indicate the TTI bundling configuration and necessary information for PUSCH transmission. The TTI bundling configuration information can include, but is not limited to activation/deactivation of TTI bundling for the WRTU; the number of bundled subframes (when and if applicable); and the maximum number of hybrid-automatic repeat request (HARQ) re-transmissions. Other TTI bundling configuration information can be provided as necessary such as, for example, the redundancy version (RV) value as further explained below.

A limited RB allocation and MCS may be used for the Physical Uplink Shared CHannel (PUSCH) when TTI bundling is applied, since the radio link condition may be very weak. The MCS and/or DMRS fields can be used to signal restricted RB allocation, MCS, the number of bundled TTIs or subframes and the TTI bundling configuration.

Referring now to FIG. 6(a) and FIG. 6(b), another example embodiment is shown using PDCCH signaling. In this example embodiment, the method uses PDCCH DCI formats 0 and 1A that are aligned (e.g., the same length) as shown in FIGS. 6(a) and 6(b), respectively. In this example embodiment, the PDCCH DCI format 0 adds an additional bit that provides the padding in order to have the same length as PDCCH DCI format 1A and the additional bit of DCI format 0 may be used to support TTI bundling switching and/or activation. When the TTI bundling bit is set to 1, it is an indication that TTI bundling is activated. The remainder of the PDCCH DCI format 0 can be used to indicate the rest of the TTI bundling configuration and information necessary for PUSCH transmission. As previously stated above, limited/restricted RB allocation and MCS may be used for PUSCH when TTI bundling is applied since the radio link condition may be very weak. The RB allocation, MCS and/or DMRS fields can be used to signal restricted RB allocation, MCS, the number of bundled TTIs or subframes and the TTI bundling configuration.

In another embodiment, a medium access control (MAC) control element (CE) is used to provide signaling for TTI bundling in the uplink. This can be a special MAC_CE used for TTI bundling signaling, e.g., activation/deactivation, along with providing the TTI bundling value or can be combined with other parameters in one MAC_CE. The TTI bundling value refers to the number of subframes, timeslots or other applicable units that are bundled together and treated as one unit. The MAC_CE header can indicate that this MAC_CE is TTI bundling signaling in the uplink. The contents of the MAC_CE can be the same as that proposed for using PDCCH signaling. Radio Resource Control (RRC) decides whether to use MAC_CE or PDCCH for TTI bundling signaling.

The MAC_CE can be used both for the configuration and reconfiguration of a TTI bundling value to the WTRU. The MAC_CE, to configure a TTI bundling value, can be sent at the time when a new service and/or connection is established or can be sent after the service and/or connection is established to reconfigure the TTI bundling parameters including a TTI bundling value. The MAC_CE includes a TTI_Bundle_Value which can be set to 2, 4, 8 in this example, although other integer values could also be used in alternate embodiments.

As stated above, the RV value may to be provided in the signaling message. The RV value used for TTI bundling can be the same or different than the TTI bundling value. The RV values should correspond to the different number of TTIs that are to be used for the TTI bundle, e.g., RV values for 2, 4 or 8 bundled TTIs (as is currently proposed). It may be configured dynamically or semi-statically. When RV values used for TTI bundling are semi-static, they can be signaled during the configuration or re-configuration phase through RRC or MAC_CE signaling. If RV values for TTI bundling are dynamic, then they can be signaled during TTI bundling activation through MAC_CE or PDCCH signaling.

When RRC message signaling is used to signal RV values, these values are contained in the IE MAC-Configuration (MAC-Configuration information element (IE)) which is used to specify the MAC layer configuration for data radio bearers as shown in FIG. 7. In an example embodiment, the RRC can signal all the RV values for all of the different TTI bundling values or in another embodiment, the RRC can signal RV values corresponding to the configured TTI bundling value. In the semi-static example embodiment, RVs for the configured TTI bundling value should be signaled.

In an example embodiment for when MAC_CE signaling is used for RV values, the MAC_CE can signal all the RV values for all of the different TTI bundling values or in another embodiment, the MA_CE can signal RV values corresponding to the configured TTI bundling value. In the semi-static exemplary embodiment, RV values for the configured TTI bundling value should be signaled.

Criteria To Trigger (Activate) TTI Bundling

The criteria to trigger TTI bundling can be based on any combination of the following factors: Pathloss—this factor can indicate whether the WTRU is at the cell edge and if the WTRU is at cell edge this may mean the uplink channel quality is low; Signal to Noise and Interference ratio, e.g., SINR—this factor can indicate the signal quality and the interference level; number of retransmissions or number of NAKs, etc.—this factor can directly reflect the transmission quality; Quality of UL sounding channel—this factor can indicate whether the uplink channel has good quality; Quality of Service (QoS)—this indicator can reflect the priority and delay requirement of the service; power headroom; and uplink channel capacity. Analysis of the above factors can be used to determine whether to trigger TTI bundling in the following retransmissions.

Activation Details

Activation of TTI bundling can be included in the PDCCH when making the resource allocation for retransmission by the base station, e.g., an evolved NodeB (eNB). Activation can also or alternatively be accomplished using a MAC_CE. The activation can be signaled to a WTRU explicitly or implicitly.

Explicit activation of TTI bundling can occur by using a one bit indication contained in the uplink grant of the PDCCH; a one bit indication at any other pre-defined position in the PDCCH; or by using a MAC_CE, where the MAC_CE can contain an indication to activate TTI bundling.

Implicit activation of TTI bundling can occur if the uplink grant indicates that the resource allocation for retransmission of the initially transmitted packet is across several TTIs rather than one TTI. After the WTRU detects this information, the WTRU knows that this implies that the TTI bundling should be used in the following retransmissions. When semi-static TTI bundling is used, the WTRU implicitly knows from the RRC or MAC_CE because of the TTI bundling value that is sent for the retransmissions.

There are two scenarios for uplink resource allocation for retransmissions using TTI bundling, thus different signaling methods should be used in PDCCH:

Scenario 1: The same physical resources, (such as frequency bands and antenna, etc), transport format (such as MCS and power, etc), HARQ parameters (such as RV values) will be used for different TTIs in the same TTI bundle. In this scenario the uplink grant contained in PDCCH only needs to signal resource allocation parameters for one TTI. The activation of TTI bundling will automatically imply to use the same resource allocation for the other TTIs (or subframes) in the TTI bundle.

Scenario 2: Different physical resources, transport format and HARQ parameters will be used for different TTIs in the TTI bundle. Also the same RV values or different RV values can be applied to different TTIs in the TTI bundle. In this scenario the uplink grant contained in the PDCCH signals resource allocation parameters for all different TTIs in the TTI bundle. This can also implicitly indicate to the WTRU that TTI bundling is used for retransmissions.

De-activation Details And WTRU Behavior

De-activation of uplink TTI bundling and the corresponding WTRU behavior is now described. In an example embodiment, whenever the WTRU receives an ACK from a previous retransmission using TTI bundling, then the WTRU knows that the retransmission using TTI bundling has been successful and no more TTI bundling will be used for this packet. The WTRU should clear the HARQ buffer related to that HARQ process.

When uplink TTI bundling is activated when at least one HARQ process is still active, (e.g., the WTRU is waiting for HARQ feedback or has a pending retransmission), the following provides example WTRU behaviors.

In an example embodiment, the WTRU keeps the currently active HARQ process running until either a successful transmission occurs or the maximum number of retransmissions is reached. After that, TTI bundling is activated at the WTRU. From the time the RRC message is received to the time TTI bundling becomes effective at the WTRU's side, the base station, e.g., an eNB, should not schedule any uplink new data transmissions where the starting time falls in that range.

In another example embodiment, the WTRU applies TTI bundling immediately. The TTI bundle size $N_{bundle}$ determines the maximum number of HARQ processes, $N_{HARQ\_bundle\_max}$, when TTI bundling is used. For example, for $N_{bundle}=4$, $N_{HARQ\_bundle\_max}$ equals to 4. If the number of currently active HARQ processes at the WTRU is more than $N_{HARQ\_bundle\_max}$, it needs to be reduced to at most $N_{HARQ\_bundle\_max}$. A pre-defined rule for which HARQ processes to keep or flush should be known to both the WTRU and the base station.

In another example embodiment, the base station does not schedule any new data transmission for the WTRU for a fixed duration, say T. The duration T is long enough so that currently active HARQ processes at the WTRU will either succeed or fail after the maximum number of retransmissions when T expires. Then (after the duration of T), the base station will send signaling to the WTRU to activate uplink TTI bundling.

When uplink TTI bundling is deactivated when at least one HARQ process is still active, (e.g., it waits for HARQ feedback or has a pending retransmission), the following provides example WTRU behaviors.

In an example embodiment, the WTRU keeps the currently active HARQ process running until success or failure occurs after the maximum number of retransmissions is reached. After that, TTI bundling becomes disabled at the WTRU's side. From the time the RRC message is received to the time TTI bundling becomes disabled at the WTRU's side, the base station should not schedule any uplink new data transmission whose starting time falls in that range.

In another example embodiment, the WTRU applies TTI bundling immediately. Within one bundle-mode HARQ round-trip-time (RTT), there are at most $N_{HARQ\_bundle\_max}$ active HARQ processes at the WTRU. There are several example cases.

Figure 8:
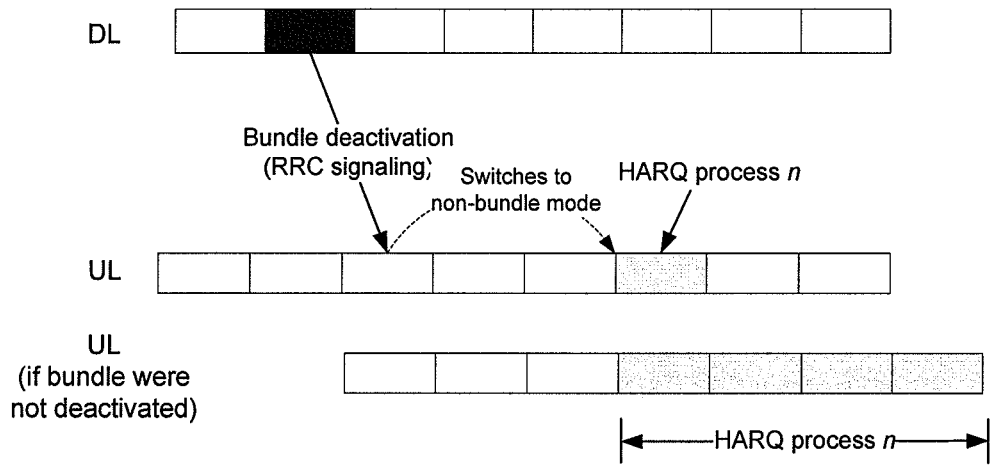
FIG. 8 shows an example TTI bundling diagram in accordance with an example embodiment.

In example case 1, if the time that TTI bundling deactivation signaling is received at the WTRU is early enough to allow the WTRU to stop transmission for the next bundled HARQ process, then the WTRU transmits the next (and subsequent) HARQ process in the non-bundled mode instead of bundle-mode, as shown in FIG. 8.

Figure 9:
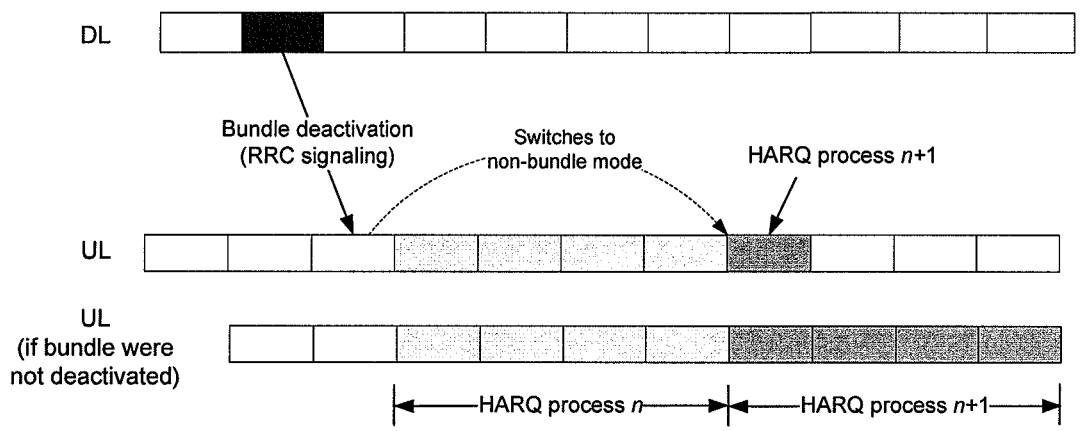
FIG. 9 shows another exemplary TTI bundling diagram in accordance with an exemplary embodiment.

In example case 2, if the time that TTI bundling deactivation signaling is received at the WTRU is not early enough to stop transmission for the next bundled HARQ process, say process n, then as shown in the exemplary example in FIG. 9, the WTRU should 1) transmit the HARQ process n in the bundled mode and 2) transmit the HARQ process n+1 (and subsequent ones) in the non-bundled mode instead of bundle-mode.

In another example embodiment, the base station does not schedule any new data transmission for the WTRU for a fixed duration, say T. The duration T is long enough so that currently active HARQ processes at the WTRU will either succeed or fail after the maximum number of retransmissions when T expires. Then (after the duration of T), the base station sends signaling to the WTRU to deactivate uplink TTI bundling.

Figure 10:
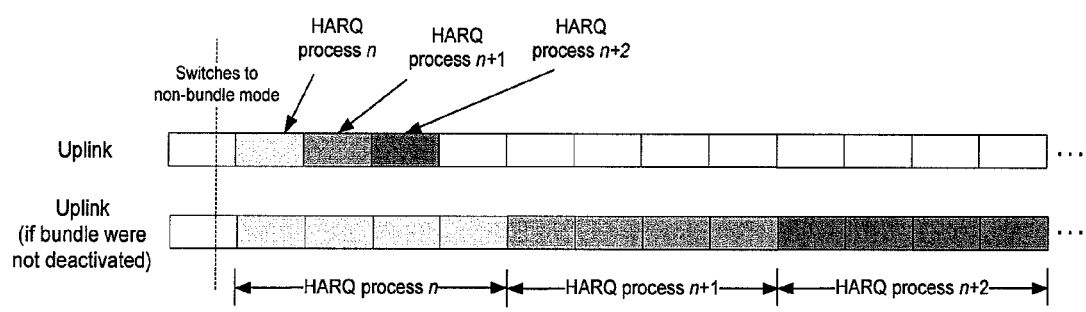
FIG. 10 shows an example hybrid-automatic repeat request (HARQ) process transmission after a TTI bundling deactivation in accordance with an example embodiment.

When the WTRU switches from bundle mode to non-bundle mode (after receiving deactivation signaling), existing active HARQ processes in bundle-mode may need to be converted to non-bundle mode. Accordingly, HARQ processes converted from bundle-mode HARQ processes may be transmitted in the order of bundle-mode HARQ processes, as shown in FIG. 10.

Synchronization Processing

If uplink TTI bundling activation/deactivation is not properly configured or synchronized between the WTRU and base station, the problem needs to detected and corrected. The following example methods for detection of the problem may be employed.

Figure 11:
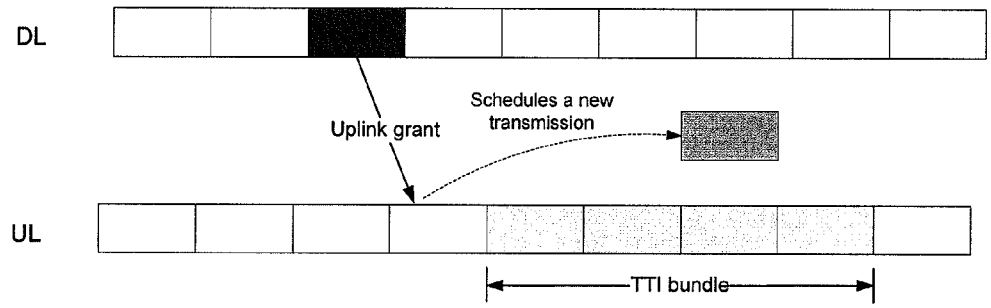
FIG. 11 shows an example TTI bundling diagram with an uplink grant in accordance with an example embodiment.

In an example embodiment, the WTRU detects the (de) activation/synchronization problem. If the WTRU thinks it is configured for TTI bundling but receives an uplink grant conflicting with the current TTI bundling, it may regard the TTI bundling as not being configured correctly or the TTI bundling is not synchronized between the WTRU and base station. For example, the WTRU receives an uplink grant which schedules a new data transmission that will conflict with its TTI-bundled transmission, as shown in FIG. 11.

In another example embodiment, the base station detects the activation/synchronization problem. For a WTRU that has been configured in the bundle-mode by the base station, if the base station detects that in the same bundle, one or several of the $2^{nd}$, $3^{rd}$, $4^{th}$ HARQ transmissions has an energy level below a pre-determined threshold, then it will consider it as that WTRU is not (properly) configured in bundling mode.

For a WTRU that has been configured in the non-bundle mode by the base station, if the WTRU is not scheduled to transmit in subsequent $2^{nd}$, $3^{rd}$, $4^{th}$ sub-frames following an uplink data transmission in a set of RBs denoted by S, but the base station detects 1) energy levels at the set S (or a subset of S) in subsequent $2^{nd}$, $3^{rd}$, $4^{th}$ sub-frames is above a (pre-determined) threshold even when set S (or a subset of S) is not allocated to other WTRUs; or 2) a collision with other WTRUs scheduled transmission on the set S (or a subset of S) in subsequent $2^{nd}$, $3^{rd}$, $4^{th}$ sub-frames; then upon detecting the TTI bundling (de)activation/synchronization problem, the base station activates/deactivates the WTRU for uplink TTI bundling again.

Partial Services

In an example embodiment, when TTI bundling is configured for a WTRU, it is configured for all of its services. In another example embodiment, a partial (or mixed) TTI bundling mode can be configured. For illustrative purposes, a WTRU can be configured to use TTI bundling for low latency services, such as for example, voice or services with small radio link control (RLC) packet data unit (PDU) sizes. On the other hand, a WTRU can transmit in non-bundle mode for best effort services or services with large RLC PDU sizes.

TTI Bundling AND Semi-Persistent Scheduling

In an example embodiment, whether TTI bundling is used in Semi-Persistent Scheduling (SPS) mode may be pre-defined in the 3GPP standard or configured in a RRC or MAC_CE message signaling during the configuration phase, the reconfiguration phase, or both. When TTI bundling is used for SPS, the radio resource for retransmission may not be signaled by the base station via the PDCCH. However, this operation needs to be signaled by the base station so that the WTRU knows to perform retransmissions during SPS without waiting for reconfiguration signaling from the base station The RRC or MAC_CE may signal to the WTRU whether the radio resource for retransmission will be reconfigured if TTI bundling is used for SPS.

If no reconfiguration is indicated, then predefined frequency and resource blocks may be used for TTI bundling. The predefined radio resources may be the same for all bundled subframes, or the radio resources may vary from subframe to subframe according to the RRC or MAC_CE configuration. The variation may be a certain hopping pattern in the frequency domain. If it receives a NAK, the WTRU may not use the predefined radio resources for other uplink transmissions.

When there is no need for reconfiguration for TTI bundling for SPS, the redundancy version (RV) value used for TTI bundling may be the same as is used for the initial transmission.

When there is no signaling for retransmission resource allocation, and an uplink TTI-bundled retransmission collides with a subsequent initial TTI-bundled transmission, the initial transmission should take the higher priority. This means that, either the retransmission should be canceled or resource allocation is needed.

When a RRC message is used to signal whether to use TTI bundling for SPS and whether to allow reconfiguration of resource for retransmissions, it can be contained in the Information Element (IE) MAC-Configuration, which is used to specify the MAC layer configuration for data radio bearers as shown in FIG. 12.

When TTI bundling is used for SPS and the base station signals resource allocation for retransmissions, the PDCCH may only contain the resource allocation information for the first subframe. The WTRU may use the same resource allocation for other subframes in the same bundle.

If the frequency and resource blocks are different subframe by subframe, then the resource allocation for retransmissions can be signaled for all the subframes used for TTI bundling.

Activation and De-activation TTI Bundling for SPS via layer one Signaling, layer two Signaling, or both.

Activation of UL TTI Bundling

In an example embodiment, activation of uplink TTI bundling for SPS may be included in the PDCCH when making the resource allocation for retransmission by the base station. In another embodiment, activation can be done by using the MAC CE. The activation can be signaled to the WTRU explicitly or implicitly. Signaling for both methods is considered as follows.

Explicit activation of TTI bundling can occur by using a one bit indication in the uplink scheduling grant carried on the PDCCH; a one bit, or one code-point, indication at any other pre-defined position in the uplink scheduling grant carried on the PDCCH; or by using the MAC_CE, where the MAC_CE can contain an indication to activate TTI bundling for SPS.

Implicit activation of TTI bundling can occur if the uplink grant indicates that the resource allocation for retransmission of the initially transmitted packet is across several TTIs rather than one TTI. After the WTRU detects this information, the WTRU knows that this implies that TTI bundling should be used in the following retransmissions. When semi-static TTI bundling is used, the WTRU implicitly knows from the RRC or MAC_CE because of the TTI bundling value that is sent for the retransmissions.

There are two scenarios for UL resource allocation for retransmissions using TTI bundling for SPS, thus different signaling methods should be used in PDCCH.

Scenario 1: The same physical resources (such as frequency bands and antenna, etc.), transport format (such as MCS and power, etc.), HARQ parameters (such as RV values), may be used for different TTIs in the same TTI bundle. In this scenario, the uplink grant contained in the PDCCH may signal resource allocation parameters for the first sub-frame. The activation of TTI bundling will automatically imply the use of the same resource allocation for the rest of the TTIs in the TTI bundle.

Scenario 2: Different physical resources, transport formats and HARQ parameters may be used for different TTIs in the TTI bundle. Either the same RV values or different RV values can be applied to different TTIs in the TTI bundle. In this scenario, the uplink grant contained in PDCCH may signal resource allocation parameters for all different TTIs in the TTI bundle for SPS retransmission. This may implicitly indicate to the WTRU that TTI bundling is used for retransmissions.

De-activation of Uplink TTI Bundling And WTRU Behavior

De-activation of uplink TTI bundling and the corresponding WTRU behavior may be such that when the WTRU receives an ACK for a previous retransmission using TTI bundling, the WTRU knows that the transmission using TTI bundling is successful and no more TTI bundling will be used for the packet. The WTRU should clear the HARQ buffer related to that HARQ process.

A method and apparatus for supporting uplink TTI bundling in LTE is provided. Described above are related method and apparatus for signaling, activation/deactivation and WTRU behavior. Signaling and wireless transmit receive unit behavior for transmission time interval bundling with semi-persistent scheduling in long term evolution is disclosed. Methods to support uplink TTI bundling in Semi-Persistent Scheduling (SPS) may include the use of RRC or MAC_CE. These signals may be used to inform the WTRU that the radio resources for retransmission will be reconfigured. Predefined frequency and resource blocks may be used for TTI bundling. The message can be contained in the Information Element (IE) MAC Configuration. Both activation and deactivation of TTI bundling are supported, and may be indicated explicitly or implicitly. Different signaling schemes may be used depending on whether the same physical resources are used for retransmissions.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for supporting uplink Transmission Time Interval (TTI) bundling, the method comprising:
receiving, via a physical downlink control channel (PDCCH) or a medium access control (MAC) control element (CE), a TTI bundling message that enables a wireless transmit/receive unit (WTRU) to support uplink TTI bundling, the TTI bundling message including a TTI bundling active/de-active field and a TTI bundling configuration;
determining a state of a hybrid acknowledgement repeat request (HARQ) process;
determining an uplink TTI bundling procedure using the TTI bundling message and the HARQ process state; and
sending a transmission via a physical uplink shared channel (PUSCH) using the determined TTI bundling procedure.

2. The method of claim 1, wherein the TTI bundling message further includes at least one of a value for a number of bundled sub-frames, a number of TTIs in a TTI bundle, or a maximum number of HARQ re-transmissions.

3. The method of claim 1, wherein the TTI bundling message uses a bit-field in a radio block (RB) allocation field, a bit-field in a modulation and coding scheme (MCS) field, or a bit-field in a demodulation reference symbol (DMRS) field.

4. The method of claim 1, wherein sending the transmission via the PUSCH using the determined TTI bundling procedure further comprises using a radio block (RB) allocation and a modulation and coding scheme (MCS) on a condition that TTI bundling is activated.

5. The method of claim 4, further comprising receiving the RB allocation via a MCS field or a demodulation reference symbol (DMRS) field.

6. The method of claim 4, further comprising receiving the MCS via a MCS field or a demodulation reference symbol (DMRS) field.

7. The method of claim 1, wherein the TTI bundling message is in a PDCCH DCI format 0.

8. The method of claim 7, wherein the TTI bundling message is of a length equivalent to a PDCCH format 1A.

9. The method of claim 1, wherein the TTI bundling active/de-active field is included within a header of the MAC CE.

10. The method of claim 1, wherein the TTI bundling message includes a redundancy version (RV) value.

11. The method of claim 10, wherein the RV value can be configured dynamically or semi-statically.

12. The method of claim 1, wherein the TTI bundling message indicates a condition that should trigger TTI bundling.

13. The method of claim 1, further comprising clearing a HARQ buffer.

14. The method of claim 1, further comprising activating TTI bundling with the HARQ process.

15. The method of claim 1, further comprising providing the HARQ process until success or failure for a minimum number of retransmissions.

16. The method of claim 14, further comprising applying TTI bundling upon activation.

17. The method of claim 14, further comprising ensuring that a data transmission is not scheduled for a fixed duration.

18. The method of claim 1, further comprising deactivating TTI bundling when the HARQ process state indicates that the HARQ process is active.

19. The method of claim 1, wherein sending the transmission via PUSCH using the determined TTI bundling procedure further comprises sending in a non-bundled mode in response to receipt of the TTI bundling message within a predefined interval.

20. The method of claim 1, further comprising detecting an error condition with respect to the TTI bundling message and a current configuration of the WTRU.

21. The method of claim 1, further comprising configuring at least one service in a TTI bundling mode.

22. The method of claim 1, wherein the TTI bundling message indicates that TTI bundling is activated for semi-persistent scheduling.

23. A wireless transmit/receive unit (WTRU), the WTRU comprising:
    a processor, the processor configured to:
        receive a TTI bundling message, via a physical downlink control channel (PDCCH) or a medium access control (MAC) control element (CE), that enables a WTRU to support uplink TTI bundling, the TTI bundling message including a TTI bundling activate/de-activate field and a TTI bundling configuration;
        determine an uplink TTI bundling procedure using the TTI bundling message and the HARQ process state; and
        send a transmission via physical uplink shared channel (PUSCH) using the determined bundling procedure.

* * * * *